United States Patent [19]

Shonaka

[11] Patent Number: 4,989,178
[45] Date of Patent: Jan. 29, 1991

[54] PROGRAMMABLE CONTROLLER HAVING FORCIBLY SET OR RESET I/O STATES CONTROLLED BY STORED FLAGS IN A FLAG MEMORY

[75] Inventor: Hisashi Shonaka, Hirakata, Japan

[73] Assignee: Omron Tateisi Electronics Co., Kyoto, Japan

[21] Appl. No.: 917,054

[22] Filed: Oct. 9, 1986

[30] Foreign Application Priority Data

Oct. 11, 1985 [JP] Japan ................... 60-226416

[51] Int. Cl.$^5$ ............... G06F 12/14; G06F 12/16; G06F 11/00
[52] U.S. Cl. ................... 364/900; 364/969.1; 364/969.2
[58] Field of Search ... 364/200 MS File, 900 MS File, 364/300, 147, 521; 371/2, 6, 10, 16, 20, 21, 72, 29, 30

[56] References Cited

U.S. PATENT DOCUMENTS

| | | | |
|---|---|---|---|
| 4,122,531 | 10/1978 | Tamaru et al. | 364/900 |
| 4,298,958 | 11/1981 | Takaki et al. | 364/900 |
| 4,388,695 | 6/1983 | Heinemann | 364/900 |
| 4,439,830 | 3/1984 | Chueh | 364/200 |
| 4,441,155 | 4/1984 | Fletcher et al. | 364/200 |
| 4,442,487 | 4/1984 | Fletcher et al. | 364/200 |
| 4,528,636 | 7/1985 | Robinson, III | 364/521 |
| 4,554,630 | 11/1985 | Sargent et al. | 364/200 |
| 4,574,350 | 3/1986 | Starr | 364/200 |
| 4,592,053 | 5/1986 | Matsuura | 371/29 |
| 4,602,368 | 7/1986 | Circello et al. | 371/21 |
| 4,651,298 | 3/1987 | Currier, Jr. | 364/900 |
| 4,651,323 | 3/1987 | Goodman et al. | 371/60 |
| 4,672,573 | 6/1987 | Shonaka | 364/900 |
| 4,703,414 | 10/1987 | Inoue et al. | 364/147 |

Primary Examiner—Thomas C. Lee
Assistant Examiner—Robert B. Harrell
Attorney, Agent, or Firm—Dickstein, Shapiro & Morin

[57] ABSTRACT

A programmable controller includes an I/O memory for storing a plurality of input/output data items, a flag memory storing the same number of flags as the number of data items in the I/O memory, a data setter for writing set data or reset data into a relevant location in the I/O memory and for writing corresponding flag data into a relevant location of the flag memory in response to a certain I/O forced action operation, and a write control circuit for controlling the supply of writing pulses to the I/O memory by referring to the corresponding flag data of the flag memory for each item when writing data into the I/O memory during the execution of a command or during the updating of an input.

3 Claims, 7 Drawing Sheets

PROGRAMMABLE CONTROLLER HAVING FORCIBLY SET OR RESET I/O STATES CONTROLLED BY STORED FLAGS IN A FLAG MEMORY

BACKGROUND OF THE INVENTION

The present invention relates to a programmable controller, and more particularly relates to a programmable controller that has the function of operating in the state in which an input signal, an output signal, and an internal auxiliary relay are forcibly set (ON state) or reset (OFF state).

In a programmable controller, it is desired to forcibly set or reset an arbitrary input or output when a user program is being debugged during an I/O simulation.

In such a case, according to a conventional type of programmable controller, one or more manual switches is/are provided on an I/O terminal, and by turning on and off this manual switch or switches, the input or the output is forcibly set or reset.

However, according to this type of operation, complicated wiring is required to be performed on the I/O terminal, and cumbersome work is necessitated and the efficiency of work is therefore low.

SUMMARY OF THE INVENTION

Accordingly, it is the primary object of the present invention to provide a programmable controller, which avoids the problems detailed above.

It is a further object of the present invention to provide such a programmable controller, which can conduct an I/O simulation without actually requiring any external wiring to the input terminal or to the output terminal.

It is a further object of the present invention to provide such a programmable controller, which does not require any complicated work to be performed on the I/O terminal.

It is a further object of the present invention to provide such a programmable controller, the operation of which is not cumbersome.

It is a further object of the present invention to provide such a programmable controller, which keeps operational efficiency high.

According to the most general aspect of the present invention, these and other objects are attained by a programmable controller, comprising: (a) an I/O memory for containing certain items; (b) a flag memory having the same number of flags as the number of items of said I/O memory; (c) a forced action start control means for writing set data or reset data into a relevant location in said I/O memory and for writing forced action yes data into a relevant location of said flag memory in response to a certain I/O forced action operation; and (d) a write control means for controlling the supply of writing pulses to said I/O memory by referring to the corresponding flag of said flag memory for each item when writing data into said I/O memory during the execution of a command or during the updating of the input. Thus, this programmable controller can operate in the state in which an input signal, an output signal, and/or an internal auxiliary relay are forcibly set or reset.

According to such a programmable controller as specified above, such a simulation can be conducted without performing any wiring or providing a switch to an external output terminal or to an external input terminal. Accordingly, the operation is not cumbersome, and operational efficiency is kept high.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and.

DESCRIPTION OF THE PREFERRED EMBODIMENT

Figure 1:
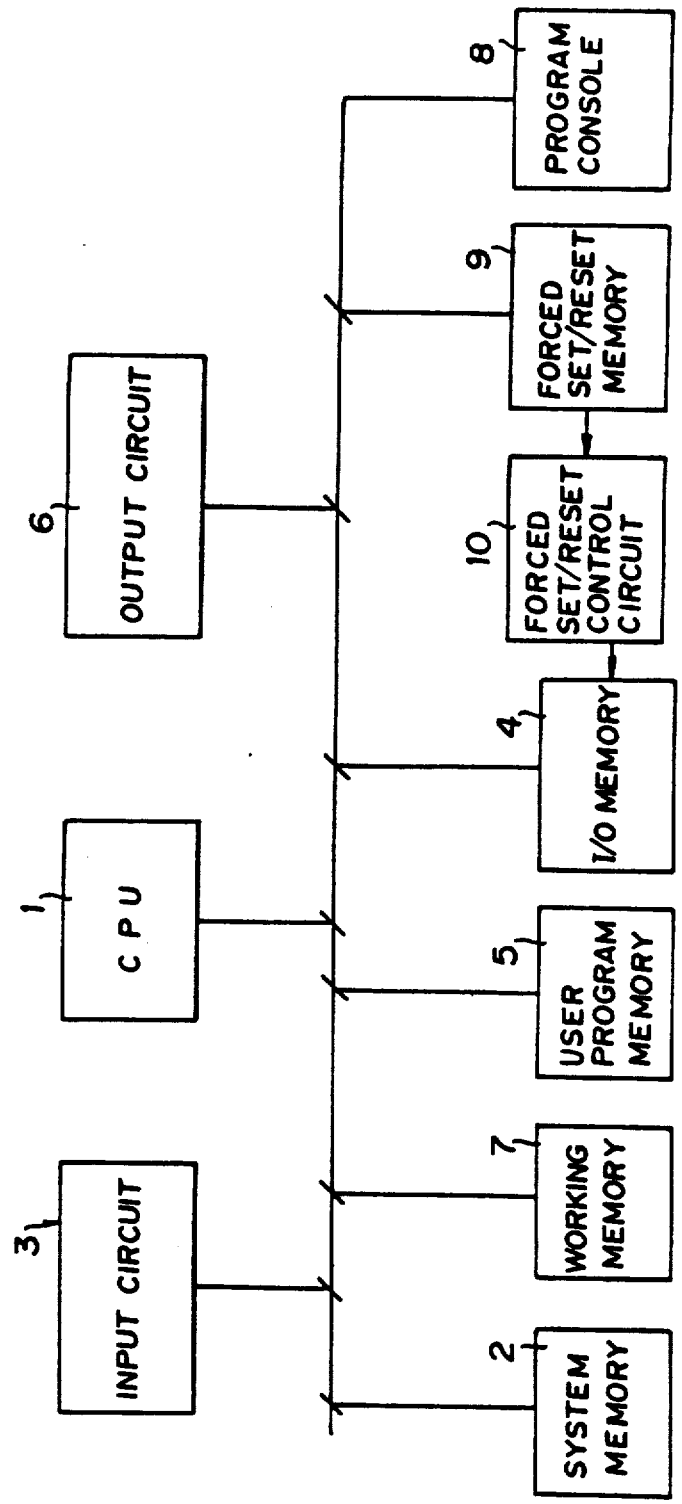
FIG. 1 is a block diagram showing the overall structure of the preferred embodiment of the programming controller of the present invention.

The present invention will now be described with reference to the preferred embodiment thereof, and with reference to the figures. FIG. 1 is a block diagram showing the overall structure of the preferred embodiment of the programmable controller of the present invention.

Referring to this figure, the reference numeral 1 denotes a CPU (central processing unit), which is built as a micro processor. This CUP 1 provides various system service functions, in addition to the normal functions which are required in any programmable controller, by executing various system programs which are stored in a system memory, denoted by the reference numeral 2.

The basic functions of a programmable controller include, as is per se well known in the prior art, the function of input updating for writing the input data obtained from an input circuit 3 into an input area of an I/O memory 4, the function of command execution for sequentially reading each user command from a user program memory 5 according to a program counter and executing it while referring to the I/O data from the I/O memory 4, and an output updating function which transfers the output data in the I/O memory 4 which was rewritten according to the results of the execution of the commands to an output circuit 6 and then to the outside.

Typical service functions include a programming function for writing a user program into the user program memory 5 in response to key entries from a program console 8, and a monitor function for displaying the state of execution of the user command on a display unit on said program console 8 by referring to the user program in the user memory 5 and to the I/O data stored in the I/O memory 4.

A working memory 7 is utilized as a storage area for intermediate results of arithmetic operations which are performed during the course of executing the various system programs.

The forced set/reset memory 9 and the forced set/reset control circuit 10 are provided for implementing the inventive concept of the present invention, and their detailed structures and functions will be described later in this specification.

Figure 2:
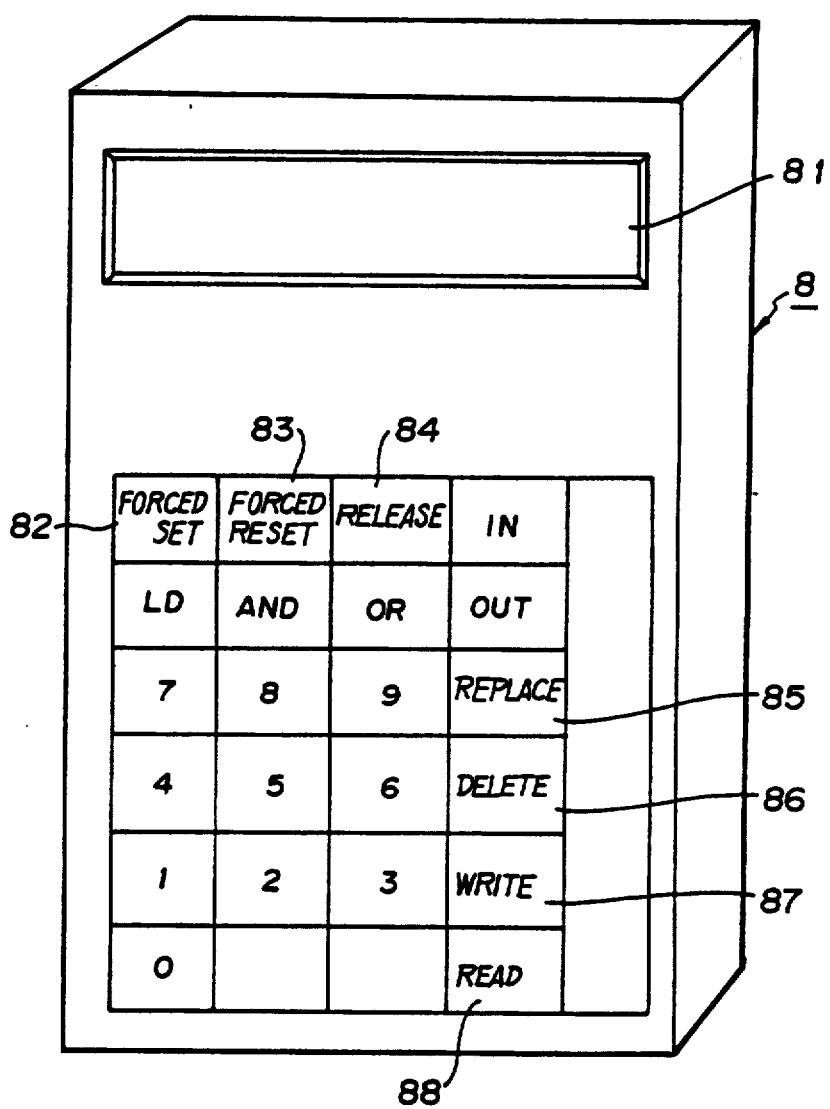
FIG. 2 is a perspective view of a keyboard of a program console of said preferred embodiment programmable controller, showing various keys provided thereon in detail.

The program console 8 is mainly used for program writing and program monitoring, and its front panel is provided with a keyboard having various keys provided thereon, as well as with a display unit 81, as illustrated in perspective view in FIG. 2.

These keys include a "forced set" key 82, a "forced reset" key 83, and a "release" key 84, which are particularly related to the inventive concept of the present invention, as well as a numeric key pad with keys "0" through "9" provided thereon, command keys such as LD, AND, OR, OUT, IN, and the like, a replace key 85, a delete key 86, a write key 87, and a read key 88. By appropriate operation of these various keys, specific input signals, output signals, and auxiliary relays may be forcibly set or reset as the case may be.

Figure 3:
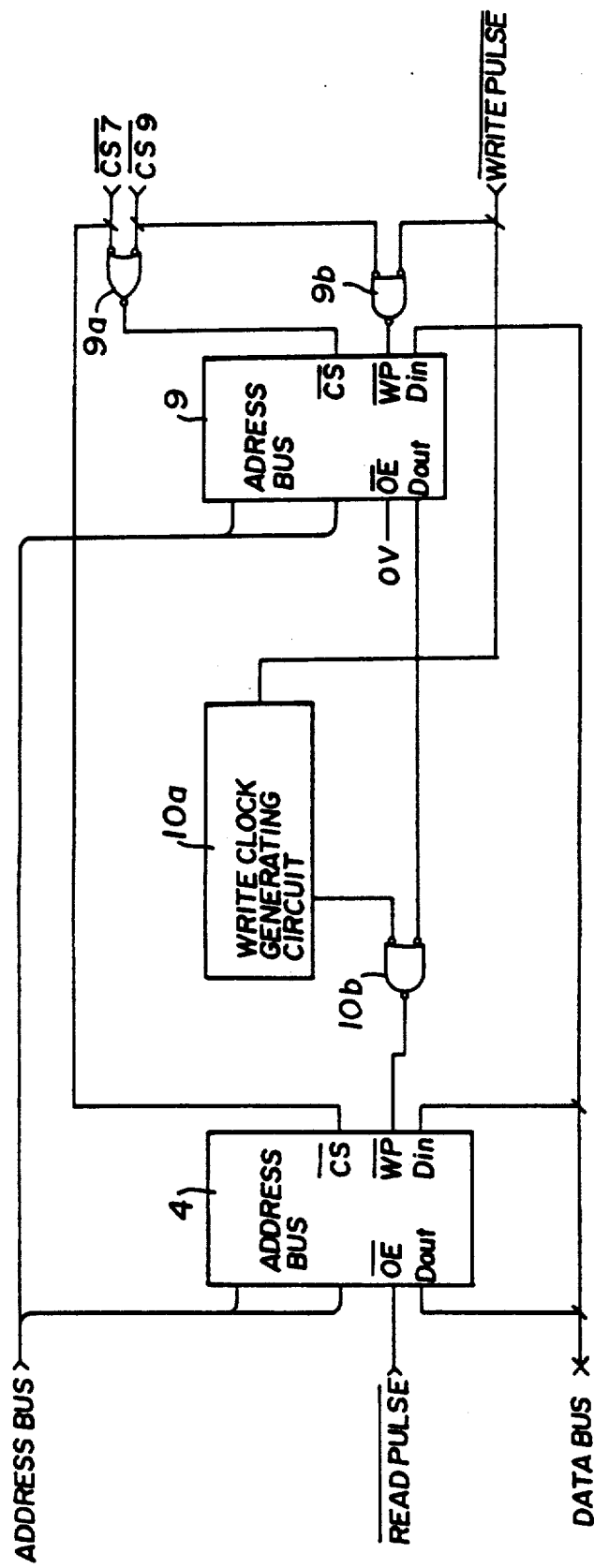
FIG. 3 is a detailed block diagram showing the structures of a forced set/reset memory and a forced set/reset control circuit included in said preferred embodiment programmable controller.

Now, the structures of the forced set/reset memory 9 and the forced set/reset control circuit 10 will be described in the following, with reference to FIG. 3 which is a detailed block diagram including said structures. In this exemplary preferred embodiment, the I/O memory 4 and the forced set/reset memory 9 are both made up of 1Mb RAMs (one megabit read only memory chips), and they are arranged in identical memory spaces. A chip select signal CS7 is suppied to the chip select terminal CS of the forced set/reset memory 9 by way of an OR gate 9a, and directly to the chip select terminal CS of the I/O memory 4. Therefore, identical memory addresses in the I/O memory 4 and the forced set/reset memory 9 can be accessed at the same time, if certain address data is transmitted on the address bus, when the chip select signal CS7 is "L".

A chip select signal CS9 is supplied to the write pulse terminal WP of the forced set/reset memory 9 by way of an AND gate 9b, and a zero voltage "L" signal is supplied to the out enable terminal OE of said forced set/reset memory 9.

Therefore, one bit of data can be written in the corresponding location of the forced set/reset memory 9 by supplying a chip select signal CS9 "L" and a write pulse "L" when a certain address is sent out onto the address bus.

The one bit data written from a data input terminal Din can be read out, as it is, from a data output terminal Dout, if OE is "0".

Figure 4:
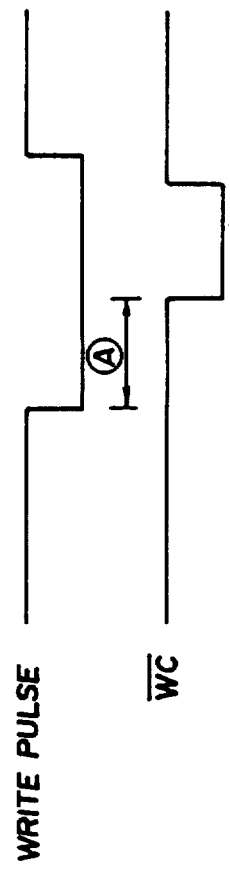
FIG. 4 is a time chart showing the timing of a write clock and of a write pulse.

The forced set/reset control circuit 10 comprises a write clock generating circuit 10a (refer to FIG. 4 which is a time chart showing the timing of the write clock and the write pulse), and a AND gate 10b which is controlled by the output data of the forced set/reset memory 9 and which supplies a write clock signal from the write clock generating circuit 10a to the write pulse terminal WP of the I/O memory 4 in a controlled manner. As shown by the time chart of FIG. 4, the write clock generating circuit 10a produces a write clock signal WC after a time delay of A from the write pulse signal.

Therefore, if "1" is stored in a certain address of the forced set/reset memory 9 and then a write pulse is supplied to the same address in the I/O memory 4, the AND gate 10b is inhibited by the output "1" of the data output terminal Dout of the forced set/reset memory 9, and thereby the write clock WC is not supplied to the write pulse terminal WP of the I/O memory 4, thereby inhibiting the writing of data into said I/O memory 4.

On the other hand, if "0" is stored in a certain address of the forced set/reset memory 9 and then a write pulse is thereafter supplied to the same address in the I/O memory 4, the AND gate 10b is released from being inhibited by the output "0" of the data output terminal Dout of the forced set/reset memory 9, and thereby the write clock WC is supplied to the write pulse terminal WP of the I/O memory 4, thereby releasing the inhibition of the writing of data into said I/O memory 4.

Figure 5:
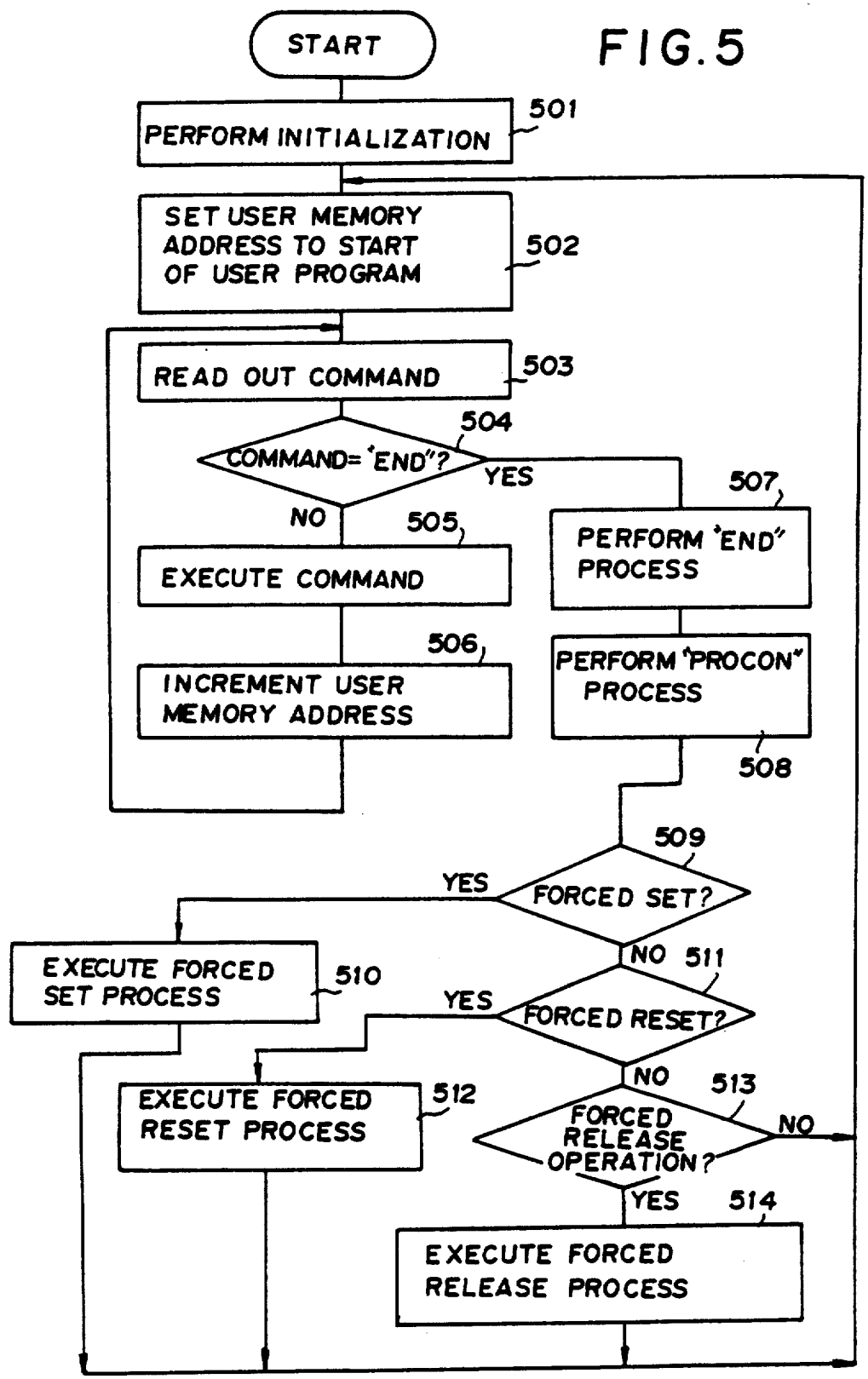
FIG. 5 is a flow chart showing the overall process flow of this preferred embodiment programmable controller.

Based upon such a hardware structure, the overall process flow of the programmable controller will now be described in the following, with reference to the flow chart thereof shown in FIG. 5.

First, after the program has been started by turning on the power at the START block, in the next step 501 the various flags, registers, and so on are reset according to the operation of an initialization process, and then the flow of control passes next to the step 502.

In this step 502, the address of the user memory (referred to as UAD) is set to the start of the user program, before starting the execution of the user commands; and next the flow of control passes to the step 503. Suppose that the forced set command and the forced reset command are both currently released. In this case, "0" is currently stored in each of the addresses of the forced set/reset memory 9 as shown in FIG. 3. Therefore, the AND gate 10b is open for all the addresses, and the write clock WC is supplied to the write pulse terminal WP of the I/O memory 4 as it is.

If the execution of a user command is started in this state, the address of the user memory is incremented in the step 506, and a command is read out each time in the step 503. If the command which has been read out is not an END command (i.e., if the result of the test in the step 504 is NO), then the command is executed by referring to the I/O data of the I/O memory 4 in the step 505, and the output data (including the auxiliary relays) of the address corresponding to the result of the command execution is rewritten (the step 505).

In this rewriting process, since the AND gate 10b is kept open as mentioned previously, the rewriting process for the I/O data can be executed without any problem.

If an END command is read out from the user program memory, as determined by the result of the test in the decision step 504, the flow of control is passed next to the step 507. In this step, a per se conventional "END" process is executed, and then control passes next to the step 508. In this "END" process, the output data of the I/O memory 4 which has been rewritten as a result of the execution of a command is sent out to the outside by way of the output circuit (this is the output updating process), and after receiving new input data from the input circuit it is written into the input area of the I/O memory 4 (this is the input updating process).

In this writing process, since the AND gate 10b is kept open as mentioned previously, the process of writing all the input data obtained from the input circuit can be written into the corresponding addresses of the I/O memory 4 without any substantial problem.

In the next step 508, a so called programmable controller or "PROCON" process is executed, in which key entry from the program console is accepted. Here, operations of flags such as "forced set yes", "forced reset yes", "release forced operation yes", and so on are executed. Next, the flow of control passes to the decision step 509.

Next, in this decision step 509, a decision is made as to whether the "forced set yes" condition holds, or not. If the answer to this decision is NO, so that the "forced set yes" condition does not currently hold, then the flow of control passes next to the decision step 511. On the other hand, if the answer to this decision is YES, so that the "forced set yes" condition currently holds, then in this case the flow of control passes next to the step 510.

In this next decision step 511, a decision is made as to whether the "forced reset yes" condition holds, or not. If the answer to this decision is NO, so that the "forced reset yes" condition does not currently hold, then the flow of control passes next to the decision step 513. On the other hand, if the answer to this descision is YES, so that the "forced reset yes" condition currently holds, then in this case the flow of control passes next to the step 512.

Figure 6:
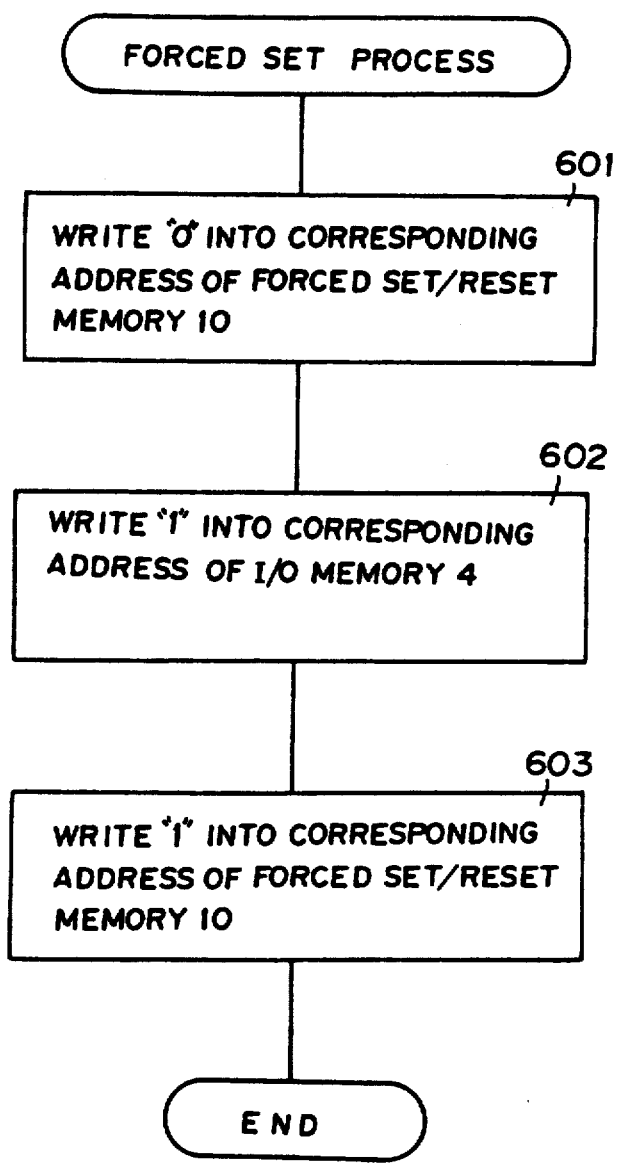
FIG. 6 is a flow chart illustrating a forced set process.
Figure 7:
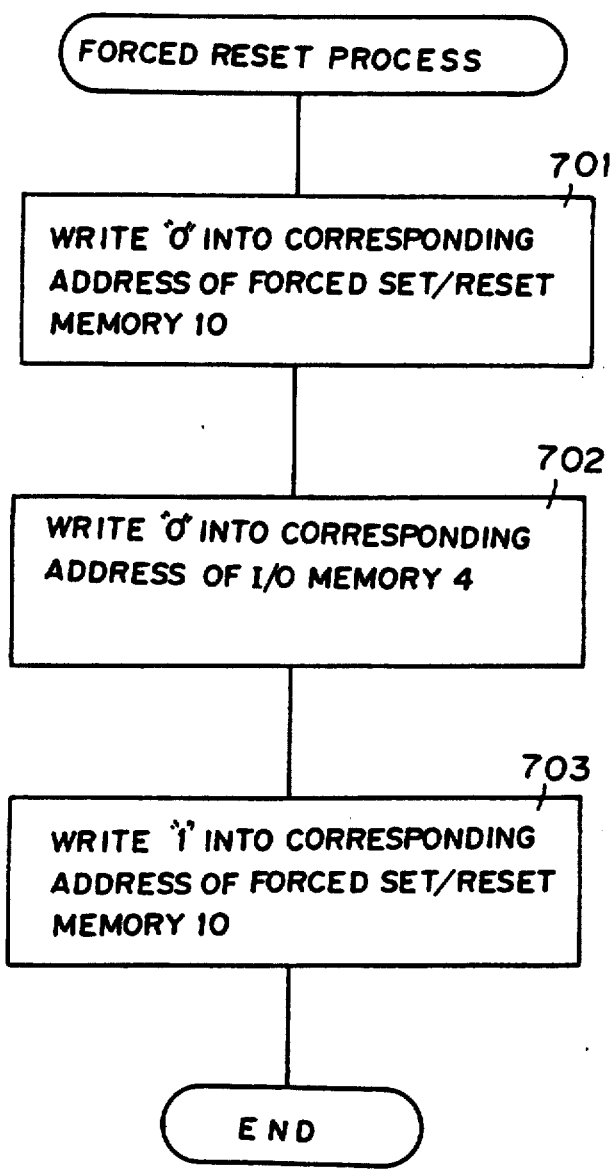
FIG. 7 is a flow chart illustrating a forced reset process.

In this next decision step 513, a decision is made as to whether the "forced release operation yes" condition holds, or not. If the answer to this decision is YES, so that the "forced release operation yes" condition currently holds, then in this case the flow of control passes next to the step 514. On the other hand, if the answer to this decision is NO, so that the "forced release operation yes" condition does not currently hold, then none of the "forced set yes", the "forced reset yes", and the "forced release operation yes" conditions are currently holding, and in this case the normal operating conditions are maintained, by the flow of control passing next to the step 502 again, to repeat the cycle of this FIG. 5 program again, i.e. by repeating the above described commands, the "END" process, and the "PROCON" process. In this operational condition, if a key of the FIG. 2 keyboard on the program console 8 such as the "forced set" key 82, the "IN" key, the "OUT" key, or a numerical key is operated, and a forced set command is issued for a certain I/O (which causes a YES decision in the decision step 509), the forced set process illustrated further in the flow chart of FIG. 6 is executed from the step 510. On the other hand, if a key of the FIG. 2 keyboard on the program console 8 such as the "forced reset" key 83, the "IN" key, the "OUT" key, or an numerical key is operated, and a forced reset command is issued for a certain I/O (which causes a YES decision in the decision step 511), the forced reset process illustrated further in the flow chart of FIG. 7 is executed from the step 512. And the releasing of the forced set state or the forced reset state can be effected by giving a release command for the relevant address by using the "release" key 84, the "IN" key, the "OUT" key, or a numerical key of the FIG. 2 keyboard on the program console 8. In this case, a YES decision in the decision step 513 occurs, and the forced set or forced reset release operation process illustrated further in the flow chart of FIG. 8 is executed from the step 514.

In the forced set process illustrated in the flow chart of FIG. 6, first in the step 601 a "0" (OFF state) is written into the corresponding address of the forced set/reset memory 9, and then control passes to the step 602. In this step 602, a "1" or ON state is written into the corresponding address of the I/O memory 4, and then control passes to the step 603. And, in this step 603, a "1" or "forced operation yes" is written into the corresponding address of the forced set/reset memory 9, and then the flow of control passes to leave this FIG. 6 routine, without doing anything further. If the address which is designated for forced set is for output, then the rewriting of the output when executing a command is prohibited, but on the other hand if the address which is designated for forced set is for input, then the rewriting of the output when updating the input is prohibited, with the result that the state of the present address is kept a "1" and the so called forced set state is accomplished.

In the forced reset process illustrated in the flow chart of FIG. 7, first in the step 701 a "0" (OFF state) is written into the correponding address of the forced reset/reset memory 9, and then control passes to the step 702. In this step 702, a "0" or OFF state is written into the corresponding address of the I/O memory 4, and then control passes to the step 703. And, in this step 703, a "1" or "forced operation yes" is written into the corresponding address of the forced reset/reset memory 9, and then in the flow of control passes to leave this FIG. 7 routine, without doing anything further. If the address which is designated for forced reset is for output, then the rewriting of the output when executing a command is prohibited (step 505) in the same manner as in the previous case, but on the other hand if the address which is designated for forced reset is for input, then the rewriting of the output when updating the input is prohibited (step 507), with the result that the state of the present address is kept at "0" and the so called forced reset state is accomplished.

Figure 8:
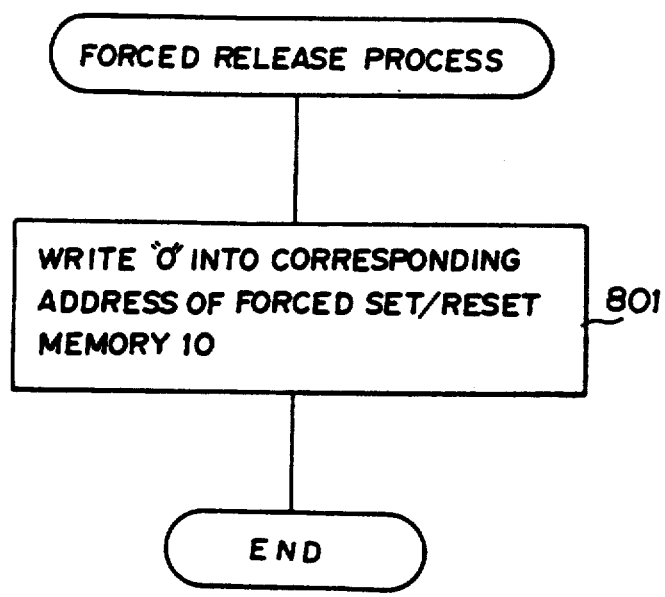
FIG. 8 is a flow chart illustrating a forced set or forced reset release process.

In the forced release process illustrated in the flow chart of FIG. 8, first in the step 801 a "0" (OFF state) is written into the corresponding address of the forced release/reset memory 9, and thus the AND gate for this particular address is opened and the prohibition of the write clock WC is lifted; and then the flow of control passes to leave this FIG. 8 routine, without doing anything further.

According to this above described preferred embodiment of the programmable controller of the present invention, and I/O can be set to the forced set state or to the forced reset state, and the forced state can be released at any time point, simply by using the "forced set" key 83, the "forced reset" key 83, the "release" key 84, the IN key, the OUT key, and the numerical keys on the program console 8. Therefore, this programmable controller of the present invention can permit I/O simulations with very simple operations, as contrasted with the case of providing manual switches to the I/O terminals of a conventional programmable controller. Accordingly, the device is not cumbersome to use, and operational efficiency is kept high.

The above described exemplary preferred embodiment of the programmable controller of the present invention pertained to a programmable controller of the END refresh type, but the present invention in not to be considered as limited to this, but could be applied equally successfully to a refresh type programmable controller. Accordingly, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Thus, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. A programmable controller having an input/output simulation function for debugging user programs and comprising:

an input/output memory means for storing a plurality of input/output data items, said input/output memory means including means for writing input/output data items into said input/output memory means during an execution of a programmed command or during an updating of input data;

flag memory means for storing a plurality of flag data items, said flag memory means storing a number of flag data items which corresponds in number to a number of input/output data items stored in said input/output memory means, each said flag data item corresponding to a respective input/output data item;

means for setting predetermined values of said input/output data items at selected addresses in said input/output memory means; and control means for controlling said writing means to control the writing of input/output data items into said input/output memory means, said control means operating, during the execution of a programmed command or during the updating of input data, to inhibit the writing of input/output data items in said input/output memory means where a corresponding flag data item in said flag memory has been set, said setting means, when setting a selected input/output data item in said input/output memory means also setting in said flag memory means a flag value corresponding to the selected input/output data item.

2. A programmable controller as in claim 1 wherein address locations in said input/output memory means for said input/output items are identical to address locations in said flag memory for said corresponding flag data items, so that address data which addresses an input/output data item also addresses a flag data item corresponding thereto.

3. A programmable controller as in claim 2 wherein said control means comprises a write clock pulse generating circuit and an AND gate for receiving at one input thereof an output of said write clock pulse generating circuit and at another input thereof addressed flag data items from said flag memory means, said AND gate controlling passage of write clock pulses from said generating means to said input/output memory means to thereby control the writing of input/output data items into said input/output memory means by the corresponding flag data items.

* * * * *